US008145617B1

(12) United States Patent
Verstak et al.

(10) Patent No.: US 8,145,617 B1
(45) Date of Patent: Mar. 27, 2012

(54) GENERATION OF DOCUMENT SNIPPETS BASED ON QUERIES AND SEARCH RESULTS

(75) Inventors: Alexandre A. Verstak, Cupertino, CA (US); Anurag Acharya, Campbell, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/282,560

(22) Filed: Nov. 18, 2005

(51) Int. Cl.
*G06F 7/00* (2006.01)
(52) U.S. Cl. .................................. 707/708; 707/711
(58) Field of Classification Search .................. 707/708
See application file for complete search history.

(56) References Cited

U.S. PATENT DOCUMENTS

| 5,724,571 | A | 3/1998 | Woods |
| 6,334,132 | B1 | 12/2001 | Weeks |
| 6,374,260 | B1 * | 4/2002 | Hoffert et al. ............... 707/104.1 |
| 6,826,553 | B1 * | 11/2004 | DaCosta et al. .................... 707/1 |
| 6,915,294 | B1 * | 7/2005 | Singh et al. ........................ 707/3 |
| 7,032,011 | B2 * | 4/2006 | Woodard et al. ............... 709/220 |
| 2005/0131764 | A1 * | 6/2005 | Pearson et al. ................... 705/26 |

* cited by examiner

*Primary Examiner* — Fazlul Quader
(74) *Attorney, Agent, or Firm* — Fenwick & West LLP (57) ABSTRACT

A document retrieval system generates snippets of documents for display as part of a user interface screen with search results. The snippet may be generated based on the type of query or the location of the query terms in the document. Different snippet generation algorithms may be used depending on the query type. Alternatively, snippets may be generated based on an analysis of the location of the query terms in the document.

50 Claims, 4 Drawing Sheets

Google Scholar BETA

[ theory of relativity space travel ]  Search

"of" is a very common word and was not included in your search. [details]

Scholar   Results 1 - 10 of about 9,480 for theory of <u>relativity space travel</u>.

<u>Chronology protection conjecture</u>
SW Hawking - Physical Review D, 1992 - link.aps.org
... Of course, in the theory of relativity, time travel and faster- than-light space
travel are closely connected. If you can do one, you can do the other. ...
<u>Cited by 280</u> - <u>Web Search</u> - <u>adsabs.harvard.edu</u> - <u>adsabs.harvard.edu</u> - <u>ncbi.nlm.nih.gov</u>

[BOOK] <u>The large scale structure of space-time</u>
SW Hawking, GFR Ellis - 1976 - print.google.com
... Page 13. In this book we shall study the large scale structure of space-time
on the basis of Einstein's General Theory of Relativity. ...
<u>Cited by 2771</u> - <u>Web Search</u> - <u>all 2 versions »</u> - <u>Library Search</u>

301 — <u>... (Clock paradox problem resolution in relativity theory, considering space travel
effects on time ...</u>
M SACHS - PHYSICS TODAY, 1971 - csa.com
A resolution of the clock paradox(Clock paradox problem resolution in relativity  } 302
theory, considering space travel effects on time measurement and aging process ...
304 — <u>Cited by 5</u> - <u>Web Search</u> — 305

GENERATION OF DOCUMENT SNIPPETS BASED ON QUERIES AND SEARCH RESULTS

FIELD OF THE INVENTION

The present invention relates to an information retrieval system for generating snippets of documents in a large scale corpus, such as the World Wide Web.

BACKGROUND OF THE INVENTION

Information retrieval systems, generally called search engines, are now an essential tool for finding information in large scale, diverse, and growing corpuses such as the World Wide Web. Generally, search engines create an index that relates documents (or "pages") to the individual words present in each document. A document is retrieved in response to a query containing a number of query terms, typically based on having some number of query terms present in the document. The retrieved documents are then ranked according to other statistical measures, such as frequency of occurrence of the query terms, host domain, link analysis, and the like. The retrieved documents are then presented to the user, typically in their ranked order, and without any further grouping or imposed hierarchy. In some cases, a selected portion or snippet of text of a document is presented to provide the user with a preview of the content of the document. Depending on the query terms and the document, the snippet may not provide useful information to the user to assess the relevance of the document to the query.

There is a need for an information retrieval system and methodology that can provide more meaningful snippets.

SUMMARY OF THE INVENTION

The present invention includes a system and methodology for generating snippets of documents retrieved during a search based on query terms. The snippet is generated based on the location of the query terms in the document. In one aspect, the paragraphs including the query terms are scored based on the length of the paragraph and the distance of the paragraph from a location of the document, such as the beginning of the document. A snippet is generated using a paragraph selected based on the score of the paragraph, such as the highest score.

In another aspect, a snippet generating algorithm is selected based on the type of a query. The selected snippet generation algorithm generates a snippet of the document. The query type may be based on the form of the query terms or the location of query terms in the document. Thus, depending on the type of query, different snippet generation algorithms will be selected, and different types of snippets generated.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

The present invention includes a system and methodology for generating snippets of documents that are retrieved during a search based on the query terms for the search. The snippets may be generated based on the type of the query or the location of the query terms in the document.

Figure 1:
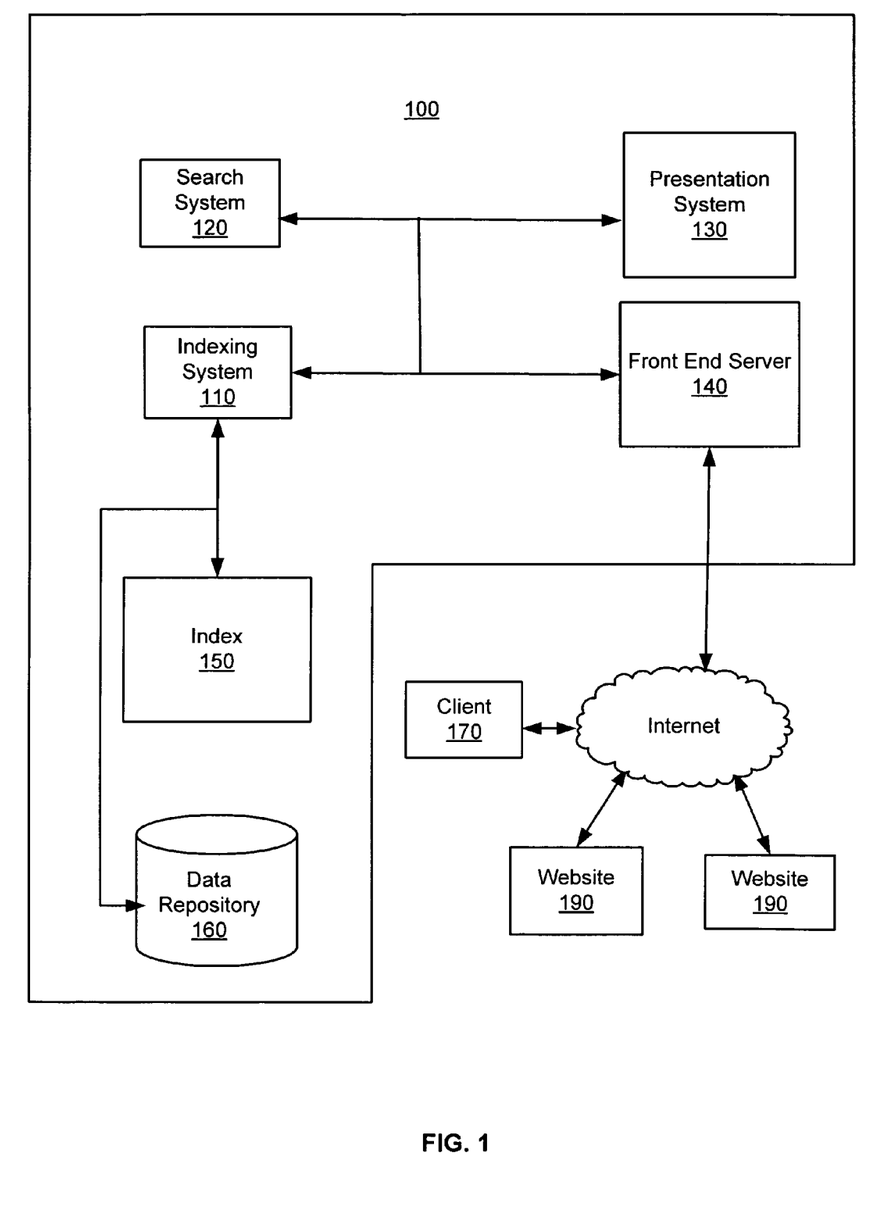
FIG. 1 is a block diagram illustrating the software architecture of a search system according to the present invention.

Referring now to FIG. 1, there is shown the software architecture of a search system 100 in accordance the present invention. The search system 100 includes an indexing system 110, a search system 120, a presentation system 130, and a front end server 140.

The indexing system 110 identifies words or terms in documents, and indexes documents according to the words or terms, by accessing various websites 190 and other document collections. The front end server 140 receives queries from a user of a client 170, and provides those queries to the search system 120. The search system 120 searches for documents relevant to the search query (search results), including identifying any query terms in the search query, and then ranking the documents in the search results using the presence of query terms to influence the ranking order. The search system 120 provides the search results to the presentation system 130. The presentation system 130 modifies the search results, generates snippets of documents, and provides the modified search results back to the front end server 140, which provides the results to the client 170. The system 100 further includes an index 150 that stores the indexing information pertaining to documents and a data repository 160 of the indexed documents.

In the context of this description, "documents" are understood to be any type of media that can be indexed and retrieved by a search engine, including web documents, images, multimedia files, text documents, PDFs or other image formatted files, and so forth. A document may have one or more pages, partitions, segments or other components, as appropriate to its content and type. Equivalently a document may be referred to as a "page," as commonly used to refer to documents on the Internet. No limitation as to the scope of the invention is implied by the use of the generic term "documents." The search system 100 operates over a large corpus of documents, such as the Internet and World Wide Web, but can likewise be used in more limited collections, such as for the document collections of a library or private enterprises. In either context, it will be appreciated that the documents are typically distributed across many different computer systems and sites. Without loss of generality then, the documents generally, regardless of format or location (e.g., which website or database) will be collectively referred to as a corpus or document collection. Each document has an associated identifier that uniquely identifies the document; the identifier is preferably a URL, but other types of identifiers (e.g., document numbers) may be used as well. In this disclosure, the use of URLs to identify documents is assumed.

The document collection may include scholarly literature, such as journal articles, conference articles, academic papers and citation records of journal articles, conference articles, and academic papers. Because works of scholarly literature are subject to rigorous format requirements, such documents have metadata information describing the content and source of the document. The document metadata includes names of authors, title, publisher, publication date, publication location, citation information, article identifiers such as Digital Object Identifier, PubMed Identifier, SICI, ISBN, and the like, network location (e.g., URL), number of references, number of citations, language, and the like.

As described above, the presentation system 130 generates a snippet of a document for display as part of the user interface screen with the search results. The presentation system 130 generates snippets based on the type of query or the location of the query terms in the document. In one embodiment, the presentation system 130 uses a plurality of different snippet generation algorithms to generate snippets responsive to different query types. Alternatively, the presentation system 130 may generate snippets based on an analysis of the location of the query terms in the document.

Figure 2:
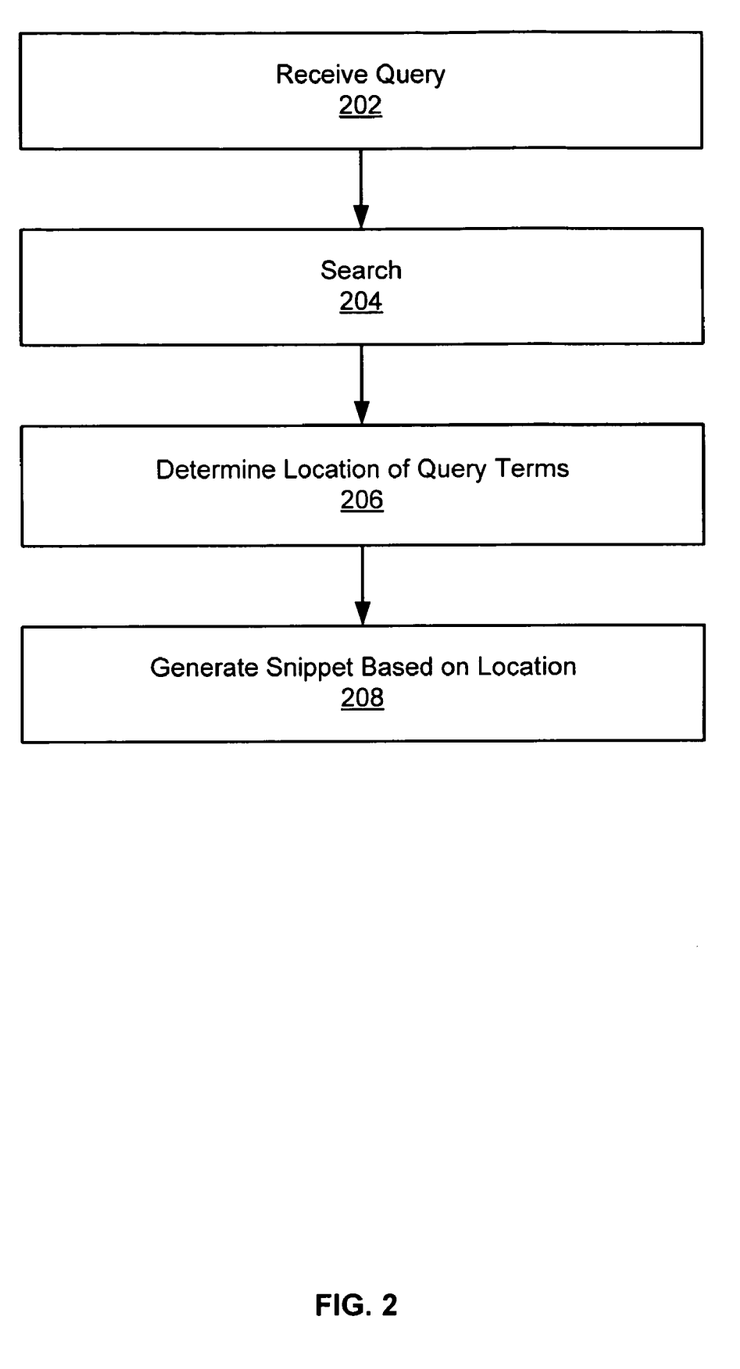
FIG. 2 is a flowchart illustrating an exemplary methodology for generating a snippet according to the present invention.

FIG. 2 is a flowchart illustrating an exemplary methodology for generating a snippet according to the present invention. The front end server 140 receives 202 queries from a client 170, and provides the query to the search system 120. The search system 120 conducts a search 204 and generates a list of documents relevant to the search query and provides the search results to the presentation system 130. The presentation system 130 determines 206 the location of query terms in each of the documents. For example, the query may include the words "theory", "relativity", "space", and "travel." The presentation system 130 generates 208 a snippet based on the location of the query terms in the document. The presentation system 130 selects a paragraph or a portion of the paragraph as a snippet based on the length and distance of the paragraph from the start of the document. For example, this may be used to find an abstract of the document. In one embodiment, each paragraph that includes the query terms is given a score based on the length of the paragraph and the distance of the paragraph from a predetermined location in the document, such as the beginning or the end of the document. The beginning of the document may be used for the types of documents that include abstracts, executive summaries or comprehensive introductions, at the beginning of the document. The end of the document may be used for other types of documents that include a conclusion or summarization at the end of the document. The scoring function may be non-linear. In addition to length and location, the scoring function also includes language dependent rules on the content of the paragraphs and formatting rules. The language dependent rules may be, for example, how much of the paragraph are punctuation characters, whether the paragraph ends with a punctuation or proposition, or whether any of the words in the paragraph is overly long. The formatting rules may be, for example, the number of bold or italicized words in the paragraph. The scoring may include the summation of one or more of the following scores:

- paragraphs shorter than a threshold get a score of 0
- paragraphs that are mostly punctuation or having punctuation that exceeds a threshold get a score of 0
- paragraphs that fail language specific rules get a score of 0
- paragraphs with italicized or bold words above a threshold get a score of 0
- kth paragraph from a starting point (e.g., abstract/beginning of document) get the score of $$k * PositionFactor + maximum(paragraph\_length, MaxParagraphLen)$$

wherein PositionFactor (a position factor or constant) may be, for example, 10, 15, or 25, and the MaxParagraphLen (maximum paragraph length) may be, for example, 50, 100 or 200 words. Each paragraph of the document is scored in this manner, and one of the paragraphs is selected on the basis of the score. The selection of a paragraph may be based on the paragraph having the highest score, or may be the first paragraph to score above a threshold amount. From the selected paragraph, the snippet is generated. The snippet may be, for example, a predetermined number of words of the selected paragraph, such as the first predetermined number of words of the paragraph (e.g., 25 words), the first one or more sentences of the paragraph (e.g., 3 sentences), a middle portion (e.g., 50 words) containing at least one of the query terms, or the entire paragraph.

Figure 3:
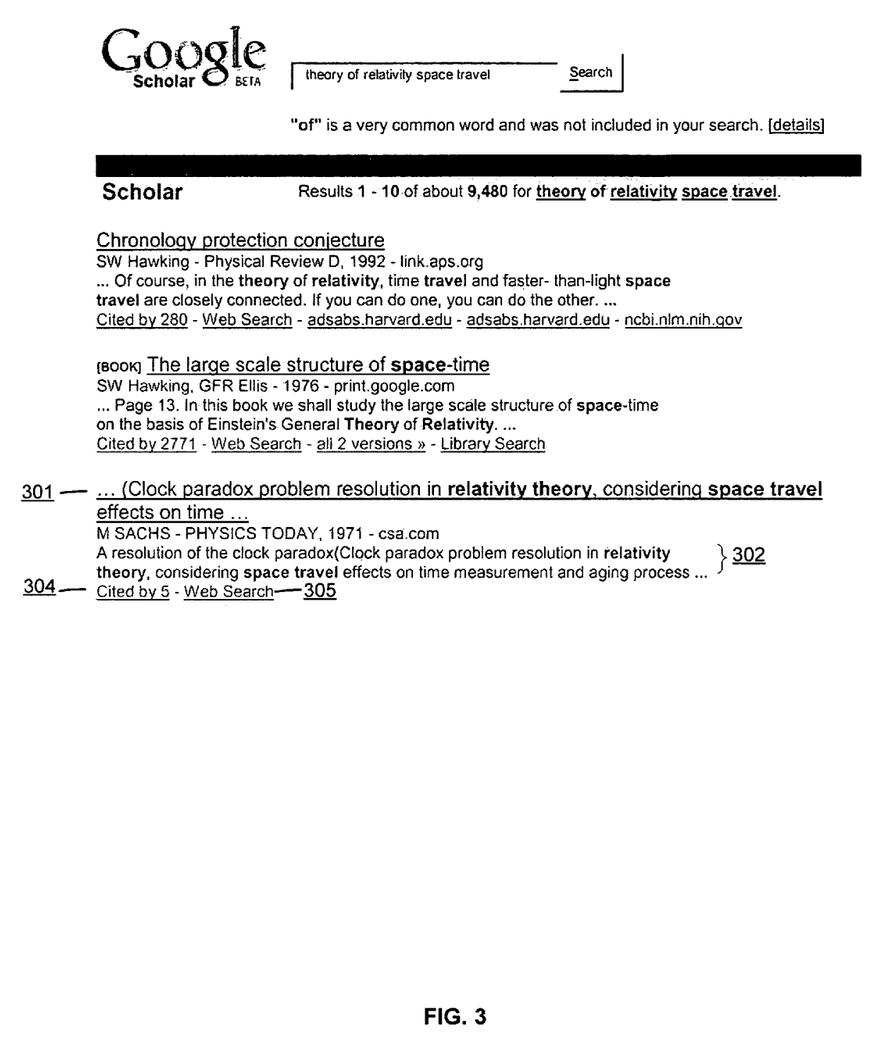
FIG. 3 illustrates a screenshot of the search system of FIG. 1.

FIG. 3 illustrates a user interface screen of an illustrative embodiment of search results. Continuing with the example of the search for "theory of relativity", "space" and "travel", the presentation system 130 generates a page illustrating a plurality of search result elements for documents retrieved by the search. Each search result element includes a link 301 to the document from the search result (e.g., "Clock paradox problem resolution in relativity theory, considering space travel effects on time" by M. Sachs and published in Physics Today in 1971). The search result element further includes a snippet 302 of portions of the document with the query terms, a link 304 to a page of documents citing the search result document, and a link element 305 for a web search for the document.

Figure 4:
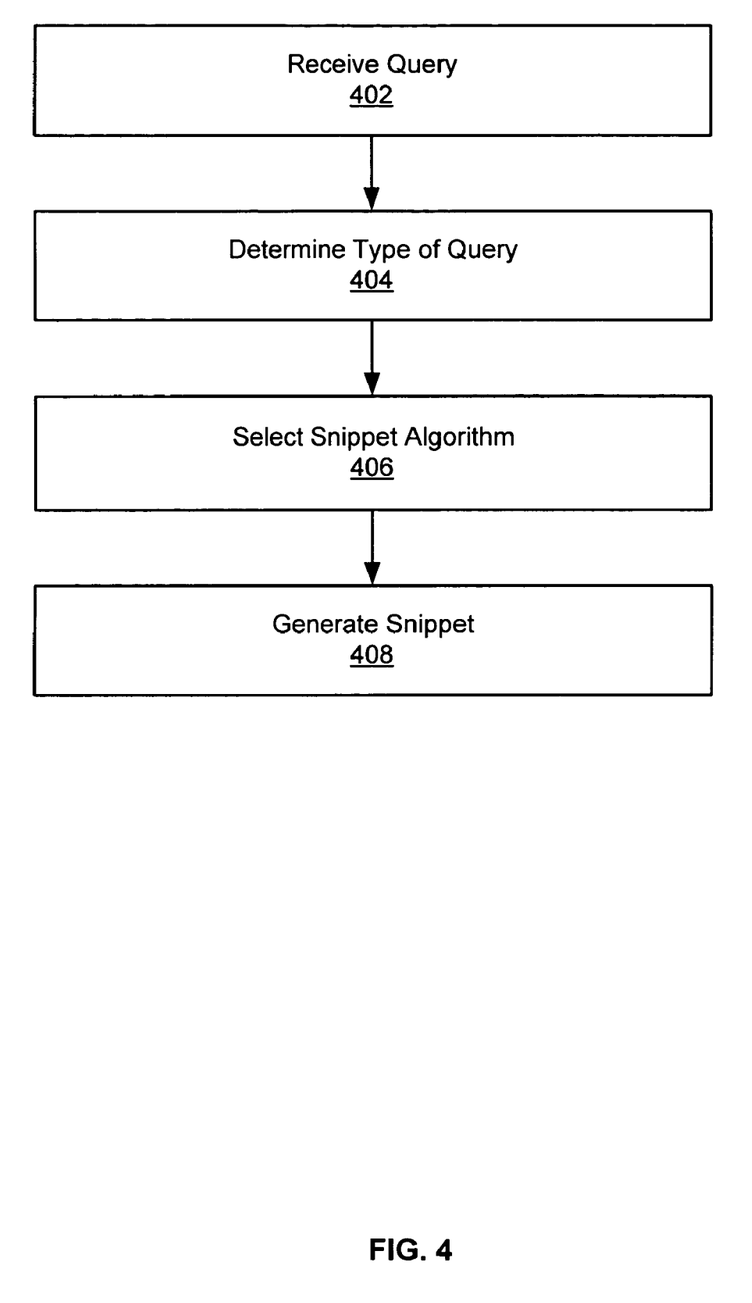
FIG. 4 is a flowchart illustrating another exemplary methodology for generating a snippet according to the present invention.

FIG. 4 is a flowchart illustrating another exemplary methodology for generating a snippet according to the present invention. The front end server 140 receives 402 a query. The presentation system 130 determines 404 the type of query. The type of query may be based on the form of the query. The form of the query may be determined from query terms, information that is the metadata, such as author, title, or journal name, a request for specific information, such as a patent, a movie, or location information, or a query including specific terms. The type of query may be based on the location of query terms in the document. The location and frequency of search terms and sequences of the search terms are determined, and a region of the document is selected as a snippet based on this determination. The system 100 may determine the type of the query by using the search system 120 to track the regions of the document or metadata matching the query terms. The presentation system 130 aggregates information from such matches from all results and uses the results to label the query. For example, if most of the results or more than a threshold number of results include the query terms in the author field, the query can be marked as an "author" query. A similar determination may be done for other metadata fields.

Based on the type of query, the presentation system 130 selects 406 the snippet algorithm. The snippet may be generated based on query terms in first or second predetermined portions of the document based on whether the query term is a first or second type, respectively. For example, the first predetermined portion may be an abstract and the second predetermined portion may be the body of the document. In one embodiment, the query type is a query for information that is in the metadata, and the snippet is generated from the body text, and not the metadata. The presentation system 130 generates 408 a snippet using the selected algorithm. For example, the selected algorithm for the generation of the snippet from the body text may include scoring each paragraph and selecting the paragraph according to score, such as described above. The snippet may be displayed in a user interface screen such as shown in FIG. 3.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for generating a snippet of a document, the method comprising:
   receiving a query comprising one or more query terms;
   selecting a document based on the query;
   identifying one or more paragraphs of the document, each identified paragraph including one or more of the query terms;
   for each of the identified paragraphs, calculating a distance from the paragraph to a beginning or an end of the document; and
   generating a snippet of the document based on the calculated distances of the identified paragraphs, wherein generating a snippet includes:
      for each of the identified paragraphs, scoring the paragraph based on a length of the paragraph and the distance of the paragraph; and
      selecting one of the identified paragraphs based on the scores of the identified paragraphs, wherein the snippet comprises one or more sentences of the selected paragraph.

2. The method of claim 1 wherein scoring a paragraph includes assigning a score to the paragraph, the score equaling the product of the number of paragraphs from the beginning or the end of the document times a position factor plus a maximum of the length of the paragraph and a predetermined maximum paragraph length.

3. The method of claim 2 wherein assigning a score further includes assigning a zero score to a paragraph shorter than a threshold, a paragraph having an amount of punctuation greater than a threshold, a paragraph failing language specific rules, and a paragraph having a number of words in bold that exceeds a threshold.

4. The method of claim 1 wherein generating a snippet further includes selecting a predetermined number of characters of the selected paragraph.

5. The method of claim 1 wherein generating a snippet further includes selecting a predetermined number of characters of the selected paragraph from a beginning of the selected paragraph.

6. The method of claim 1 wherein scoring a paragraph further includes scoring a paragraph based on language dependent rules.

7. The method of claim 1 wherein scoring a paragraph further includes scoring a paragraph based on language dependent rules and formatting rules.

8. The method of claim 1 further comprising:
   receiving a second query comprising one or more query terms;
   selecting a second document based on the second query;
   responsive to the one or more query terms of the second query being in metadata of the second document, generating a snippet of the second document based on an abstract or introduction of the second document; and responsive to the one or more query terms of the second query being not in the metadata of the second document, generating a snippet of the second document based on a frequency of the one or more query terms of the second query in locations of text of the second document.

9. The method of claim 1 further comprising:

receiving a second query comprising one or more query terms;

selecting a second document based on the second query;

responsive to the one or more query terms of the second query being in an abstract or an introduction of the second document, generating a snippet of the second document based on the abstract or the introduction of the second document; and responsive to the one or more query terms of the second query being not in the abstract or the introduction of the second document, generating a snippet of the second document based on a frequency of the query terms of the second query in locations of text of the second document.

10. The method of claim 1 wherein the document comprises one of a journal article, a conference article, an academic paper, and a citation record of a journal article, a citation record of a conference article, and a citation record of an academic paper.

11. A computer program product for use in conjunction with a computer system, the computer program product comprising a computer readable storage medium and a computer program embedded therein, the computer program including instructions for:

receiving a query comprising one or more query terms;

selecting a document based on the query;

identifying one or more paragraphs of the document, each identified paragraph including one or more of the query terms;

for each of the identified paragraphs, calculating a distance from the paragraph to a beginning or an end of the document; and generating a snippet of the document based on the calculated distances of the identified paragraphs, wherein generating a snippet includes:

for each of the identified paragraphs, scoring the paragraph based on a length of the paragraph and the distance of the paragraph; and selecting one of the identified paragraphs based on the scores of the identified paragraphs, wherein the snippet comprises one or more sentences of the selected paragraph.

12. A system for generating snippets of documents in a plurality of documents, comprising:

a processor for executing programs; and a document matching program executable by the processor, the program including:

instructions for receiving a query comprising one or more query terms;

instructions for selecting a document based on the query;

instructions for identifying one or more paragraphs of the document, including one or more of the query terms;

instructions for scoring an identified paragraph based on a length of the paragraph and a distance of the paragraph to a beginning or an end of the document;

instructions for selecting one of the identified paragraphs based on the scores of the identified paragraphs;

instructions for generating a snippet of the selected document from one or more sentences of the selected paragraph.

13. A method for generating a snippet of a document, the method comprising:

receiving a query comprising at least one query term;

selecting at least one document including an instance of the query term;

determining a type of the query based at least in part on a location where the instance of the query term occurs in the document;

selecting a snippet generation algorithm based on the query type; and generating a snippet of the document using the selected snippet generation algorithm.

14. The method of claim 13, wherein a first type of query is based on form of query terms and a second type of query is based on location of query terms in the document.

15. The method of claim 14, wherein the first type of query is based on metadata and the second type of query is based on location of query terms in a body of a document.

16. The method of claim 15, wherein generating a snippet further includes:

generating a snippet based on query terms in a first predetermined portion of the document in the event that the query is the first type; and generating a snippet based on query terms in a second predetermined portion of the document in the event that the query is the second type.

17. The method of claim 16 wherein the first predefined portion is an abstract of the document and the second predefined portion is body of the document.

18. The method of claim 13 wherein the at least one document comprises one of a journal article, a conference article, an academic paper, and a citation record of a journal article, a citation record of a conference article, and a citation record of an academic paper.

19. A computer program product for use in conjunction with a computer system, the computer program product comprising a computer readable storage medium and a computer program embedded therein, the computer program including instructions executable to:

receive a query comprising at least one query term;

selecting at least one document including an instance of the query term;

determine a type of the query based at least in part on a location where the instance of the query term occurs in the document;

select a snippet generation algorithm based on the query type; and generate a snippet of the document using the selected snippet generation algorithm.

20. A system for generating snippets of documents in a plurality of documents, comprising:

a processor for executing programs; and a document matching program executable by the processor, the program including:

instructions for receiving a query comprising at least one query term;

instructions for selecting at least one document including an instance of the query term;

instructions for determining a type of the query based at least in part on a location where the instance of the query term occurs in the document;

instructions for selecting a snippet generation algorithm based on the query type; and instructions for generating a snippet of the document using the selected snippet generation algorithm.

21. The computer program product of claim 11, wherein generating a snippet includes:
for each of the identified paragraphs, scoring the paragraph based on a length of the paragraph and the distance of the paragraph; and
selecting one of the identified paragraphs based on the scores of the identified paragraphs, wherein the snippet comprises one or more sentences of the selected paragraph.

22. The computer program product of claim 21 wherein scoring a paragraph includes assigning a score to the paragraph, the score equaling the product of the number of paragraphs from the beginning or the end of the document times a position factor plus a maximum of the length of the paragraph and a predetermined maximum paragraph length.

23. The computer program product of claim 22 wherein assigning a score further includes assigning a zero score to a paragraph shorter than a threshold, a paragraph having an amount of punctuation greater than a threshold, a paragraph failing language specific rules, and a paragraph having a number of words in bold that exceeds a threshold.

24. The computer program product of claim 21 wherein generating a snippet further includes selecting a predetermined number of characters of the selected paragraph.

25. The computer program product of claim 21 wherein generating a snippet further includes selecting a predetermined number of characters of the selected paragraph from a beginning of the selected paragraph.

26. The computer program product of claim 21 wherein scoring a paragraph further includes scoring a paragraph based on language dependent rules.

27. The computer program product of claim 21 wherein scoring a paragraph further includes scoring a paragraph based on language dependent rules and formatting rules.

28. The computer program product of claim 11 wherein the computer program further comprises instructions for:
receiving a second query comprising one or more query terms;
selecting a second document based on the second query;
responsive to the one or more query terms of the second query being in metadata of the second document, generating a snippet of the second document based on an abstract or introduction of the second document; and
responsive to the one or more query terms of the second query being not in the metadata of the second document, generating a snippet of the second document based on a frequency of the one or more query terms of the second query in locations of text of the second document.

29. The computer program product of claim 11 wherein the computer program further comprises instructions for:
receiving a second query comprising one or more query terms;
selecting a second document based on the second query;
responsive to the one or more query terms of the second query being in an abstract or an introduction of the second document, generating a snippet of the second document based on the abstract or the introduction of the second document; and
responsive to the one or more query terms of the second query being not in the abstract or the introduction of the second document, generating a snippet of the second document based on a frequency of the query terms of the second query in locations of text of the second document.

30. The computer program product of claim 11 wherein the document comprises one of a journal article, a conference article, an academic paper, and a citation record of a journal article, a citation record of a conference article, and a citation record of an academic paper.

31. The system of claim 12 wherein the instructions for scoring an identified paragraph include instructions for assigning a score to the paragraph, the score equaling the product of the number of paragraphs from the beginning or the end of the document times a position factor plus a maximum of the length of the paragraph and a predetermined maximum paragraph length.

32. The system of claim 31 wherein the instructions for assigning a score further include instructions for assigning a zero score to a paragraph shorter than a threshold, a paragraph having an amount of punctuation greater than a threshold, a paragraph failing language specific rules, and a paragraph having a number of words in bold that exceeds a threshold.

33. The system of claim 12 wherein the instructions for generating a snippet further include instructions for selecting a predetermined number of characters of the selected paragraph.

34. The system of claim 12 wherein the instructions for generating a snippet further include instructions for selecting a predetermined number of characters of the selected paragraph from a beginning of the selected paragraph.

35. The system of claim 12 wherein the instructions for scoring an identified paragraph further include instructions for scoring a paragraph based on language dependent rules.

36. The system of claim 12 wherein the instructions for scoring an identified paragraph further include instructions for scoring a paragraph based on language dependent rules and formatting rules.

37. The system of claim 12 wherein the program further comprises instructions for:
receiving a second query comprising one or more query terms;
selecting a second document based on the second query;
responsive to the one or more query terms of the second query being in metadata of the second document, generating a snippet of the second document based on an abstract or introduction of the second document; and
responsive to the one or more query terms of the second query being not in the metadata of the second document, generating a snippet of the second document based on a frequency of the one or more query terms of the second query in locations of text of the second document.

38. The system of claim 12 wherein the program further comprises instructions for:
receiving a second query comprising one or more query terms;
selecting a second document based on the second query;
responsive to the one or more query terms of the second query being in an abstract or an introduction of the second document, generating a snippet of the second document based on the abstract or the introduction of the second document; and
responsive to the one or more query terms of the second query being not in the abstract or the introduction of the second document, generating a snippet of the second document based on a frequency of the query terms of the second query in locations of text of the second document.

39. The system of claim 12 wherein the document comprises one of a journal article, a conference article, an academic paper, and a citation record of a journal article, a citation record of a conference article, and a citation record of an academic paper.

40. The computer program product of claim 19, wherein a first type of query is based on form of query terms and a second type of query is based on location of query terms in the document.

41. The computer program product of claim 40, wherein the first type of query is based on metadata and the second type of query is based on location of query terms in a body of a document.

42. The computer program product of claim 41, wherein generating a snippet further includes:
   generating a snippet based on query terms in a first predetermined portion of the document in the event that the query is the first type; and
   generating a snippet based on query terms in a second predetermined portion of the document in the event that the query is the second type.

43. The computer program product of claim 42 wherein the first predefined portion is an abstract of the document and the second predefined portion is body of the document.

44. The computer program product of claim 19 wherein the at least one document comprises one of a journal article, a conference article, an academic paper, and a citation record of a journal article, a citation record of a conference article, and a citation record of an academic paper.

45. The system of claim 20, wherein a first type of query is based on form of query terms and a second type of query is based on location of query terms in the document.

46. The system of claim 45, wherein the first type of query is based on metadata and the second type of query is based on location of query terms in a body of a document.

47. The system of claim 46, wherein generating a snippet further includes:
   generating a snippet based on query terms in a first predetermined portion of the document in the event that the query is the first type; and
   generating a snippet based on query terms in a second predetermined portion of the document in the event that the query is the second type.

48. The system of claim 47 wherein the first predefined portion is an abstract of the document and the second predefined portion is body of the document.

49. The system of claim 20 wherein the at least one document comprises one of a journal article, a conference article, an academic paper, and a citation record of a journal article, a citation record of a conference article, and a citation record of an academic paper.

50. A method, executed by a computer system, for automatically generating a snippet of a document responsive to a query comprising one or more query terms, the method comprising:
   identifying one or more paragraphs of the document, each identified paragraph including one or more of the query terms;
   scoring each of the identified paragraphs using a length of the identified paragraph, a predetermined maximum paragraph length, and a number of paragraphs from the beginning of the document to the identified paragraph;
   selecting one of the identified paragraphs based on the scores of the identified paragraphs; and
   generating the snippet from one or more sentences of the selected paragraph.

* * * * *